United States Patent
Colby et al.

(10) Patent No.: US 9,370,971 B2
(45) Date of Patent: Jun. 21, 2016

(54) METHODS FOR RETREADING A TIRE

(75) Inventors: E. Bruce Colby, Greenville, SC (US);
Dimitri G. Tsihlas, Greer, SC (US);
Cesar E. Zarak, Simpsonville, SC (US)

(73) Assignees: Compagnie Generale Des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/977,620

(22) PCT Filed: Nov. 29, 2011

(86) PCT No.: PCT/US2011/062335
§ 371 (c)(1),
(2), (4) Date: Jun. 28, 2013

(87) PCT Pub. No.: WO2012/091836
PCT Pub. Date: Jul. 5, 2012

(65) Prior Publication Data
US 2013/0276945 A1    Oct. 24, 2013

Related U.S. Application Data

(63) Continuation-in-part of application No. PCT/US2010/062449, filed on Dec. 29, 2010.

(51) Int. Cl.
*B29D 30/56* (2006.01)
*B60C 11/02* (2006.01)

(52) U.S. Cl.
CPC ............... *B60C 11/02* (2013.01); *B29D 30/56* (2013.01); *B60C 2011/0033* (2013.04)

(58) Field of Classification Search
CPC ...... B29D 30/54; B29D 30/56; B29D 30/541; B29D 30/544; B29D 30/547; B29D 2030/541; B29D 2030/544; B29D 2030/547

USPC ................................................. 156/95, 96, 98
See application file for complete search history.

(56) References Cited

U.S. PATENT DOCUMENTS

| 1,330,128 A | 2/1920 | Long |
| 2,309,042 A * | 1/1943 | Boyle ........................... 156/129 |

(Continued)

FOREIGN PATENT DOCUMENTS

| AU | 00236346 | 6/1959 |
| CH | 393948 | 6/1962 |

(Continued)

OTHER PUBLICATIONS

Machine generated English language translation of KR 10-0509186 (original document dated May 2004).*

(Continued)

*Primary Examiner* — Martin Rogers
(74) *Attorney, Agent, or Firm* — Hahn Loeser & Parks LLP; Bret A. Hrivnak (57) ABSTRACT

Embodiments include methods for retreading a tire, which include providing a tire carcass for retreading, the tire carcass having a pre-existing tread layer including one or more voids extending into the tread layer thickness from an outer side. A bonding layer is applied along an outer side of the pre-existing tread layer, the bonding layer substantially filling the voids arranged along the outer side of the pre-existing tread layer to provide an outer surface for receiving a pre-cured tread layer. The pre-cured tread layer is applied along an outer side of the bonding layer such that the bonding layer is arranged between the pre-cured tread layer and the pre-existing tread layer. The pre-cured tread layer is bonded to the tire carcass to form a retreaded tire having a retreaded tire tread. Grooves are then formed in the retreaded tire tread along a ground-engaging, outer side of the retreaded tire tread.

9 Claims, 5 Drawing Sheets

(56) References Cited

U.S. PATENT DOCUMENTS

| | | | |
|---|---|---|---|
| 2,368,172 A * | 1/1945 | Taber | 118/409 |
| 2,609,026 A | 9/1952 | Luchsinger-Caballero | |
| 2,966,936 A * | 1/1961 | Schelkmann | 156/96 |
| 3,136,352 A | 6/1964 | Pettit | |
| 3,472,714 A | 10/1969 | Ragan | |
| 3,727,661 A | 4/1973 | Hoke | |
| 3,739,828 A | 6/1973 | Schaevitz | |
| 3,783,924 A | 1/1974 | Pelletier | |
| 3,850,222 A * | 11/1974 | Lejuene | 157/13 |
| 3,884,740 A | 5/1975 | Schelkmann | |
| 3,895,985 A | 7/1975 | Schelkmann | |
| 3,897,813 A * | 8/1975 | Verdier | 152/209.18 |
| 3,919,020 A | 11/1975 | Floto | |
| 3,935,045 A | 1/1976 | Wolfe | |
| 3,945,417 A | 3/1976 | Harrelson, Jr. | |
| 3,963,066 A | 6/1976 | Schwartz et al. | |
| 3,989,563 A | 11/1976 | Schelkmann | |
| 4,114,671 A | 9/1978 | Maiocchi et al. | |
| 4,147,196 A * | 4/1979 | Jarry | 157/13 |
| 4,176,702 A * | 12/1979 | Seiberling | 152/209.6 |
| 4,185,056 A | 1/1980 | Detwiler | |
| 4,196,764 A | 4/1980 | Skidmore | |
| 4,258,776 A | 3/1981 | Walters et al. | |
| 4,276,103 A | 6/1981 | Wolfe | |
| 4,934,426 A * | 6/1990 | Remond et al. | 152/209.17 |
| 5,115,850 A | 5/1992 | Crump et al. | |
| 5,247,983 A * | 9/1993 | Inez | 157/13 |
| 5,275,218 A | 1/1994 | Nakayama et al. | |
| 5,277,727 A | 1/1994 | Seiler et al. | |
| 5,307,854 A | 5/1994 | Brewer | |
| 5,342,472 A | 8/1994 | Imahashi et al. | |
| 5,445,691 A | 8/1995 | Nakayama et al. | |
| 5,458,727 A * | 10/1995 | Meyer | 156/405.1 |
| 5,535,798 A | 7/1996 | Nakamura | |
| 5,603,366 A | 2/1997 | Nakayama et al. | |
| 6,016,858 A | 1/2000 | Roesgen et al. | |
| 6,095,217 A | 8/2000 | Nakamura et al. | |
| 6,253,815 B1 | 7/2001 | Kemp et al. | |
| 6,264,779 B1 | 7/2001 | Cappelli et al. | |
| 6,406,282 B1 * | 6/2002 | Presti | 425/14 |
| 7,128,794 B2 | 10/2006 | Veas | |
| 7,252,728 B2 | 8/2007 | Weydert et al. | |
| 8,636,044 B2 * | 1/2014 | Colby | 152/209.6 |
| 2002/0005256 A1 | 1/2002 | Fischer | |
| 2002/0040755 A1 | 4/2002 | Chamoy | |
| 2003/0211186 A1 | 11/2003 | Chamoy | |
| 2004/0007300 A1 | 1/2004 | Foucher | |
| 2004/0009255 A1 | 1/2004 | Lamoine et al. | |
| 2004/0256057 A1 | 12/2004 | Gridley et al. | |
| 2005/0016656 A1 | 1/2005 | Kuroki et al. | |
| 2006/0118223 A1 | 6/2006 | Maeda | |
| 2006/0137794 A1 | 6/2006 | Nguyen et al. | |
| 2006/0278326 A1 * | 12/2006 | Doering et al. | 156/87 |
| 2007/0062626 A1 | 3/2007 | Oyama | |
| 2007/0144641 A1 | 6/2007 | Nguyen et al. | |
| 2008/0023116 A1 | 1/2008 | Mayni et al. | |
| 2009/0159165 A1 | 6/2009 | Herberger, Sr. et al. | |
| 2009/0194213 A1 | 8/2009 | Suzuki | |
| 2009/0205762 A1 | 8/2009 | Mayni et al. | |
| 2010/0101693 A1 * | 4/2010 | Kunz | 152/209.4 |
| 2010/0154947 A1 | 6/2010 | D'Sidocky et al. | |
| 2010/0224295 A1 | 9/2010 | Aoki | |
| 2013/0146189 A1 | 6/2013 | Majumdar et al. | |

FOREIGN PATENT DOCUMENTS

| | | | |
|---|---|---|---|
| CN | 1286661 | 3/2001 | |
| CN | 1721174 | 1/2006 | |
| DE | 946956 | 8/1956 | |
| DE | 10228372 A1 | 2/2003 | |
| EP | 0097787 | 1/1984 | |
| EP | 0097787 A2 | 1/1984 | |
| EP | 0335694 | 10/1989 | |
| EP | 0730950 | 4/1997 | |
| EP | 0730950 A2 | 4/1997 | |
| EP | 0858875 | 8/1998 | |
| EP | 0858875 A1 | 8/1998 | |
| EP | 1800843 | 6/2007 | |
| EP | 2028024 | 2/2009 | |
| GB | 555976 A | 9/1943 | |
| GB | 695562 | 8/1953 | |
| GB | 695562 A | 8/1953 | |
| GB | 746375 | 3/1956 | |
| GB | 1033324 * | 6/1966 | B29D 30/0061 |
| GB | 1268480 | 3/1972 | |
| GB | 1552841 | 9/1979 | |
| GB | 2061837 | 5/1981 | |
| JP | 59070554 | 4/1984 | |
| JP | S6354240 A | 3/1988 | |
| JP | 01317807 | 12/1989 | |
| JP | 02293107 | 4/1990 | |
| JP | H0411103 A | 1/1992 | |
| JP | H05-155202 | 6/1993 | |
| JP | 05229034 | 9/1993 | |
| JP | 03096407 | 4/1994 | |
| JP | H0880582 A | 3/1996 | |
| JP | 9239864 | 9/1997 | |
| JP | 2003104010 | 4/2003 | |
| JP | 2005193853 | 7/2005 | |
| JP | 2005199762 | 7/2005 | |
| JP | 2005313764 | 11/2005 | |
| JP | 2006192795 A | 7/2006 | |
| JP | 200745354 A | 2/2007 | |
| JP | 2007069687 A | 3/2007 | |
| JP | 2007172674 | 7/2007 | |
| JP | 2007261093 | 10/2007 | |
| JP | 2007331597 | 12/2007 | |
| JP | 2008192689 | 8/2008 | |
| JP | 2009002767 | 1/2009 | |
| KR | 10-0509186 * | 5/2004 | B60C 11/00 |
| RU | 2165357 | 4/2001 | |
| WO | 2007145150 | 12/2007 | |
| WO | WO 2008 025330 * | 3/2008 | B29D 30/00 |
| WO | 2008054387 | 5/2008 | |
| WO | 2008066527 | 6/2008 | |
| WO | 2009/016971 | 2/2009 | |
| WO | 2009072633 | 6/2009 | |
| WO | 2009123610 A1 | 10/2009 | |
| WO | 2011/002448 A1 | 1/2011 | |
| WO | 2011/002454 A1 | 1/2011 | |

OTHER PUBLICATIONS

PCT/US2011/062335—International Search Report and Written Opinion dated Mar. 29, 2012, 16 pgs.

* cited by examiner

METHODS FOR RETREADING A TIRE

This application is a National Stage application of International Application No. PCT/US2011/062335, filed Nov. 29, 2011 with the U.S. Patent Office as the Receiving Office, which claims priority to, and the benefit of, International Patent Application No. PCT/US2010/062449 filed Dec. 29, 2010 with the U.S. Patent Office as the Receiving Office, the disclosures of which are incorporated herein by reference.

BACKGROUND OF THE INVENTION

This invention relates generally to retread tires and more specifically, to retread tires having tread bands matched to the prepared base tread. In particular embodiments, the prepared base tread has a thickness that is variable and asymmetric.

DESCRIPTION OF THE RELATED ART

When tires become worn, they can be restored with new tread. Large truck tires and bus tires, for example, are typically retreaded as part of a routine tire-management program. The carcass of these types of tires is often expected to last several hundred thousand miles and be amenable to having a new tread adhered to it several times. Such tires can be quite expensive and are therefore bought with the expectation that their high initial costs are offset by the long service life of the carcass and the low comparative cost of retreading. Indeed, the economics included in the selection and purchase of such tires often dictate that the original tires be capable of being retreaded as many as three or four times or more.

A variety of procedures and different types of equipment are available for use in recapping or retreading pneumatic tires. One of the first steps in retreading a worn tire is to remove remaining tread material from the tire carcass, for example, by a procedure known as buffing. Next a layer of green (uncured) rubber, known as "cushion gum," may be applied to the carcass. This layer of uncured rubber may be extruded directly onto or applied as a sheet and rolled (stitched) onto the carcass. Next, a tread band is applied atop the layer of cushion gum.

In the cold recapping or retreading process, the tread band is made of cured rubber, and has a tread pattern already impressed in its outer and possibly its inner surface. Such pre-cured bands, as the term is used herein, refer to tread bands that have undergone to some extent a curing process. The tire is then placed in an autoclave, and heated under pressure for an appropriate time to cure the cushion gum layer, and bond the gum layer to the tread and the carcass.

In the hot recapping or retreading process, the tread is made of uncured rubber and typically may have no or very little tread pattern when initially placed on the tire carcass. The tire with the uncured tread is placed in a tire mold and heated under pressure for an appropriate time to cure the gum layer and the tread, to mold the tread with the desired tread pattern, and to cause the gum layer to bond with the tread and the carcass. The term "cure" refers to the formation of cross-links between the elastomer molecules in the rubber compound, otherwise known as vulcanization.

Buffing the old tread off of the tire in preparation of the retreading process removes rubber that is discarded as waste or as a low value by-product. Most or all of this waste rubber that is removed in preparation for retreading is typically replaced during the retreading process as part of the new tread band and cushion gum that is bonded to the carcass during retreading. It would be advantageous if the amount of rubber that is discarded could be reduced, which would consequently reduce the amount of new rubber that is needed.

SUMMARY OF THE INVENTION

The present invention includes methods for retreading a tire. Particular embodiments of such methods include providing a tire carcass for retreading, the tire carcass having a pre-existing tread layer extending widthwise across the tire in a lateral direction, the tread layer including one or more voids extending into the tread layer thickness from an outer side of the pre-existing tread layer for engaging a ground surface. Such methods may further include applying a bonding layer along an outer side of the pre-existing tread layer, the bonding layer substantially filling the voids arranged along the outer side of the pre-existing tread layer to provide an outer surface for receiving a pre-cured tread layer. Methods of retreading may further include applying the pre-cured tread layer along an outer side of the bonding layer such that the bonding layer is arranged between the pre-cured tread layer and the pre-existing tread layer, the pre-cured tread layer having a thickness extending between a front face forming a ground-engaging side of the tread band and a back face arranged atop the bonding layer. The pre-cured tread layer is bonded to the tire carcass to form a retreaded tire having a retreaded tire tread. The method further includes forming grooves in the retreaded tire tread along a ground-engaging, outer side of the retreaded tire tread.

In other embodiments, methods for retreading a tire include providing a tire carcass for retreading, the tire carcass having a pre-existing tread layer extending widthwise across the tire in a lateral direction, the tread layer including one or more voids extending into the tread layer thickness from an outer side of the pre-existing tread layer for engaging a ground surface. Such methods further include applying an uncured intermediate tread layer overtop the pre-cured tread layer of the tire carcass and shaping the intermediate tread layer after it has been applied to the pre-cured tread layer in the step of applying. Such methods may further include applying a bonding layer along an outer side of the intermediate tread layer and applying a pre-cured tread layer along an outer side of the bonding layer such that the bonding layer is arranged between the pre-cured tread layer and the intermediate tread layer, the pre-cured tread layer having a thickness extending between a front face forming a ground-engaging side of the tread band and a back face arranged atop the bonding layer, although the pre-cured tread layer may be applied to the intermediate tread layer when a bonding layer is not used. Such methods may further include bonding the pre-cured tread layer to the tire carcass.

Further embodiments of the invention include retreaded tires. In particular embodiments, the retreaded tires are those formed according to the methods disclosed herein. In further embodiments, a retreaded tire includes a tire carcass having a pre-existing tread layer having a groove extending into a thickness of the pre-existing tread layer from an outer side of the pre-existing tread layer. The retreaded tire further includes a new tread layer bonded to the pre-existing tread layer. In particular embodiments, a bonding layer may be arranged between the new tread layer and the tire carcass. Particular embodiments of the retreaded tire tread include one or more grooves extending depthwise through a thickness of the pre-cured tread layer and into a thickness of the pre-existing tread layer, the one or more grooves being a new groove arranged within a thickness of the pre-existing tread layer independent of any pre-existing groove of the pre-existing tread layer such that the one or more grooves each expose the bonding layer to form a surface of the one or more grooves. If the bonding layer is present, the one or more grooves also extend through a thickness of the bonding layer.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Particular embodiments of the present invention comprise retreaded tires and methods of forming retreaded tires (i.e., methods of retreading tires). In particular embodiments, according to cold retreading operations, whereby a new pre-cured tread band is bonded to a tire carcass. The tire carcass includes a pre-existing tread which is in need of replacement. The pre-existing tread is also referred to herein as a pre-existing tread layer. The need for retreading may arise due to excessive wear or damage to the tread, for example. When a tread is worn, it is often unevenly worn in a lateral direction across the tire or in a longitudinal direction. While the tread may be worn to a depth where certain grooves or other voids no longer exist, in many instances at least many of the voids or grooves remain. Traditionally, any voids remaining in the pre-existing tread are removed during retreading operations in preparation for receiving a new tread.

In the present invention, the pre-existing tire tread or pre-existing tread layer is maintained such that at least a portion of the voids arranged in the pre-existing tread layer remain. This is in lieu of removing the pre-existing tread layer in full or removing a sufficient amount of the layer to a depth at which all voids, including grooves, no longer remain. More specifically, in the present invention, only a portion of the pre-existing tread, if any, is removed to reduce the amount of waste that is generated by the retreading process. For example, tread material within the pre-existing tread layer that remains usable may be preserved in lieu of removing at least a significant amount of the layer according to traditional retreading methods. This not only reduces waste by limiting the amount of material removed and any labor or costs associated with its removal, it may also lead to the reduction in material and costs by enabling the production of thinner treads for completing the retreading process. The grooves remaining in the pre-existing tread layer prior to application of the new tread may or may not be employed according to the methods discussed herein; that is, material cost savings can be realized by employing these methods to preserve any portion of the pre-existing tread layer, even if the grooves are removed, but not all of the material under the grooves.

In particular embodiments of the present invention, methods for retreading a tire include the step of providing a tire carcass for retreading, the tire carcass having a pre-existing tread layer extending widthwise across the tire in a lateral direction, the tread layer including one or more voids extending into the tread layer thickness from an outer side of the pre-existing tread layer for engaging a ground surface. As mentioned above, a tire for retreading includes a pre-existing tread layer. The pre-existing tread layer had a ground-engaging outer side from which the tread layer wears. The outer side comprises a surface area for engaging the ground and a surface void capable of receiving water, snow, mud, etc. during tire operation. When the tread layer includes uneven wear, the pre-existing tread layer has a variable thickness. The pre-existing tread layer may further include voids extending into the a thickness of the pre-existing tread layer from an outer side thereof. Such voids generally form recesses along the outer side of the pre-existing tread layer, and may comprise any void manufactured into the pre-existing tread layer, such as longitudinal or lateral grooves or sipes. Because the grooves may be arranged in any number of ways about the lateral centerline of the tire carcass, the depth or thickness of the pre-existing tread layer may be symmetrical or asymmetrical about a centerline of the tread width extending longitudinally along a length of the tread. Further, because the wear along the outer, ground-engaging side may be uneven, an otherwise symmetrical depth pre-existing tread layer may be asymmetrical due to the irregular wear.

Such methods may further include the step of removing at least a portion of the pre-existing tread layer to a pre-determined depth from the outer side prior to the step of applying a bonding layer. In preparation for retreading the tire, a portion of the pre-existing tread layer may be removed to any desired depth of the pre-existing tread layer to achieve an outer side of the pre-existing tread layer having any desired shape or profile and to accommodate the installation of any desired new tread. Removal may be minimal, such as to generally clean the surface of debris or other foreign substances, or more substantial as necessary to accommodate the new tread layer and any other layers employed to assemble and form the retreaded tire. Such removal may be achieved by performing a material removal process with a material removal device. Such device may comprise any means for removing a thickness of the pre-existing tread layer known to one of ordinary skill in the art. For example, an abrading or cutting operation may be performed using an abrading or cutting tool. An abrading tool may comprise an abrasive rotary disk or drum. A cutting tool may comprise a blade or knife. In particular embodiments, a thickness of material is removed along a full width of the pre-existing tread layer. In other embodiments, tread material is removed at one or more different locations along the width of the pre-existing tread layer. At each location, different amounts or thicknesses of material may be removed as desired. In certain instances, when forming a new tread with multiple strips of stacked tread material, a thickness of the pre-existing tread layer may be removed that is generally equal to total thickness of the stacked arrangement of strips. It is also understood that material surrounding any voids, such as longitudinal and/or lateral grooves, may be removed in the step of removing. In such instances, the void may be reshaped, widened, and/or deepened as needed to accommodate the application of a bonding layer and/or a new tread. The resulting pre-existing tread layer may be symmetrical or asymmetrical about the tread or tire centerline, and/or may result in a variable thickness tread layer. It is understood that in some embodiments only enough material may be removed from the preexisting tread layer, or a portion thereof, to roughen the surface to facilitate bonding of material thereto, thus preserving essentially all of the pre-existing tread in the layer, or that portion thereof.

Particular embodiments of such methods may further include the step of applying a bonding layer along an outer side of the pre-existing tread layer. The bonding layer generally comprises any elastomeric or polymeric material that is curable, that is, a material that may be vulcanized with the application of heat. In particular embodiments, the bonding material is uncured tread material. The bonding layer may operate as a mechanism for providing an outer side forming a face upon which a pre-cured tread layer (i.e., pre-cured tread band) may be applied. For example, the bonding layer may substantially fill any voids, excessively worn locations, or other abnormalities arranged along the outer side of the pre-existing tread layer to achieve an outer side of the bonding layer that is generally flat or forms a contoured surface upon which the pre-cured tread layer may be applied. The bonding layer may also facilitate bonding of the pre-cured tread layer to the pre-existing tread layer and/or tire carcass. The bottom side of the pre-cured tread layer may have a bottom side for bonding to the tire carcass which has projections or recesses, or may be generally free of any voids such that the bottom side is flat or forms a generally smoothly contoured surface. With regard to either the outer side of the bonding layer or the bottom side of the pre-cured tread band, when voids are not present thereon, such voids are noticeable voids that would otherwise form lateral or circumferential grooves. This means that surface texture may be present on each surface even though each is free of voids or smoothly contoured. Accordingly, in particular embodiments, such steps of applying comprise applying a bonding layer along an outer side of the pre-existing tread layer, the bonding layer substantially filling the voids arranged along the outer side of the pre-existing tread layer to provide an outer surface for receiving the pre-cured tread layer.

In particular embodiments, the bonding layer is formed by applying a sheet or strip of bonding layer material atop the outer side of the pre-existing tread layer, which may include application to a portion of the tire carcass, such as when a portion of the pre-existing tread has been removed to the tire carcass. The sheet or strip may be uncured or pre-cured or partially cured. The sheet or strip may have a constant thickness or a variable thickness. For example, a variable thickness may substantially fill any locations of uneven or excess wear and/or any voids extending depthwise into a thickness of the pre-existing tread layer from an outer side of such pre-existing tread layer. Depthwise generally connotes the direction a thickness extends, or, in other words, a direction extending generally between opposing sides of a thickness. The sheet or strip may be extruded and/or calendered to achieve a desired lateral (i.e., widthwise) cross-sectional thickness or profile. The sheet or strip may extend approximately or substantially the full width of the desired retreaded tire tread, of the pre-existing tread, or of the pre-cured tread layer, or any width less than the full width. Strips may be narrower in width than the sheets, as the strips may be applied at particular locations as necessary across the width of the pre-existing tread layer and/or tire carcass.

In more specific embodiments, the bonding layer is formed of multiple sheets or strips of bonding layer material, which may be of constant or variable thickness. For example, a plurality of full width sheets may be applied to build the thickness of the bonding layer to a final total thickness. Further, because the thickness of the pre-existing tread layer may vary laterally or longitudinally, such as due to uneven wear, for example, different portions of the tread width or length may require application of a different quantity of bonding layer strips to achieve a desired total thickness. These different portions may be separated or defined laterally or longitudinally, such as by longitudinal or circumferential grooves, for example. The area between a pair of longitudinal grooves can be referred to as a rib. A rib may be solid, that is, it can extend continuously in a longitudinal direction, or is can be divided into two or more tread elements, which are formed when a lateral groove extends laterally across the width of the rib to connect each of the pairs of longitudinal grooves. When forming the thickness of a bonding layer with multiple sheets or strips that are pre-cured, bonding adhesive that is curable (i.e., an adhesive that is capable of being vulcanized) is along the top and bottom of each sheet or strip to facilitate bonding of each sheet or strip to an adjacent sheet or strip, the pre-existing tread layer and/or tire carcass, or the pre-cured tread band.

In other embodiments, the bonding layer is extruded onto the outer side of the pre-existing tread layer and/or the tire carcass. The extruded bonding layer is initially uncured. A full width of the bonding layer may be extruded onto the pre-existing tread layer and/or tire carcass, which may fill any recesses in the pre-existing tread layer and/or tire carcass, such as voids or any location uneven wear recesses. Alternatively, the bonding layer may be extruded onto each rib individually, such that any longitudinal grooves remain substantially free of any bonding layer material. This also facilitates formation of a variable thickness bonding layer as the bonding layer is formed along different portions of the pre-existing tread layer and/or tire carcass, such as along individual ribs having different thicknesses within the bonding layer. The bonding layer may be shaped prior to application of a new tread layer, such as in any manner or method considered below for shaping the intermediate tread layer.

Such methods may further include the step of shaping the bonding layer prior to the step of applying a pre-cured tread band. Before a pre-cured tread band is applied to atop an outer, exposed surface of the bonding layer, the bonding layer may be shaped after it has been applied to the tire carcass. For example, the step of shaping may be performed by a molding operation. The molding process generally comprises arranging an annular mold about the outer, annular side of the bonding layer. The mold may comprise any known mold, such as a mold that is divided annularly into segments and/or divided laterally into opposing lateral mold halves. The mold may include any arrangement of features to form any desired pattern of surfaces and/or recesses along the bonding layer. The features may also be arranged for insertion into any existing recesses arranged along the outer side of the bonding layer. For example, the mold may include features for forming a longitudinal groove pre-existing between ribs upon which a bonding layer as been extruded. The mold may also be free of any void-forming features to provide a continuous surface along the outer side of the bonding layer. The mold could also consist of, or the step of shaping may be performed by, rollers configured to rotate or roll along the bonding layer and shape the bonding layer surface with the application of a shaping force, which may include pushing the bonding material into the voids of the pre-existing tread design. The rollers may be of constant diameter or may comprise contoured rollers that vary in diameter in a longitudinal direction. The rollers may be heated in particular embodiments by any known means of heating, which includes using one or more electrically resistive heating elements arranged within a thickness of the roller. Heating may also be achieved by conduction, convection, or radiation using any known heating source.

Molding may comprise hot molding or cold molding. Hot molding utilizes heat, which is applied to the tread, such as by a heated mold. Hot molding may also achieve curing or vulcanization of the bonding layer if the bonding layer is exposed to sufficient temperature for a sufficient duration of time. Cold molding comprises molding performed generally at ambient temperature (e.g., room temperature).

Hot molding may be performed when it is desirous to increase the ductility of the bonding layer to better facilitate a desired flow of the bonding layer material within a mold. Hot molding may also be performed when desiring to at least partially cure the bonding layer before application of the pre-cured tread band. For example, in particular embodiments when a thickness of a bonding layer comprises multiple sheets or strips of bonding layer material, bonding of the layers may be desired prior to application of the pre-cured tread layer. In a particular instance, the bonding layer sheets or strips are uncured while in another instance the bonding layer sheets or strips are pre-cured with bonding adhesive arranged between adjacent sheets or strips arranged depthwise. In either instance, hot molding may be performed on the bonding layer arranged atop the pre-existing tread layer and tire carcass to at least partially bond all the layers, sheets, and/or strips together before application of the pre-cured tread band. For the same reasons, hot molding may be performed on an extruded bonding layer. When any bonding layer is uncured, cold molding may be performed on such bonding layer when the uncured bonding layer material is deformable (i.e., flowable) at ambient temperatures.

Such methods may further include the step of forming an intermediate tread layer along an outer side of the bonding layer prior to the step of applying a pre-cured tread layer. It is known that locations along the pre-existing tread may be thinner than others. Such locations may be the result of excessive wear, for example. Accordingly, in order to provide a final retreaded tire tread of a desired thickness, it may be necessary to provide additional tread material above these thinner locations along the pre-existing tread layer. While the new cured tread layer may be shaped and altered to provide a variable thickness new tread layer that directs additional tread material in thinner locations of the pre-existing tread layer, an intermediate tread layer may be arranged generally between the new tire tread layer and the pre-existing tread layer. By providing this intermediate tread layer, a more standardized new tread layer may be employed more consistently from tire to tire, and any variation in tire wear from tire to tire may be accommodated or accounted for by varying an intermediate tread layer. This intermediate tread layer may be formed by extruding a layer of uncured tread material of any desired thickness at any desired lateral location. Tread layer comprises any desired curable elastomeric or polymeric material, including natural or synthetic rubber. While tread layer material may be similar to bonding layer material, the bonding layer material is compounded, or in other words, formulated, to achieve higher adhesion properties, while the tread layer material is compounded to improve wear properties. Because bonding layer material may be exposed during tire operation after sufficient wear, bonding layer material, while providing sufficient adhesion, may be compounded to provide improved wear properties. In other embodiments, the intermediate tread layer may be formed by stacking one or more strips of tread material at any desired lateral location. When multiple strips for a thickness of a bonding layer, each strip forms a sub-layer of the bonding layer thickness.

The strips may comprise pre-cured or uncured tread material. The strips may each have the same, pre-determined thickness, or strips of different thicknesses may be provided. The thicknesses may be constant or variable. Accordingly, in particular embodiments, the intermediate tread layer is formed of a plurality of strips of tread material, a thickness of the intermediate tread layer comprising one or more of the plurality of strips arranged in a stacked arrangement. Further, further embodiments of the step of forming an intermediate tread layer comprise arranging one or more of the plurality of strips in a stacked arrangement at different lateral and/or longitudinal locations relative the tire carcass, each of the different lateral locations being separated by a longitudinal groove extending longitudinally in a lengthwise direction of the pre-existing tread layer. In embodiments where the intermediate tread layer if formed from pre-cured strips or sheets, to promote bonding of the strips to each other the step of forming an intermediate tread layer includes forming a bonding layer between each sub-layer of the intermediate tread layer, the plurality of strips each comprising pre-cured tread material. In embodiments where it is desirous to bond the bonding layer formed of stacked strips prior to application of the new tread, such methods may further comprise the step of bonding the intermediate tread layer together prior to the step of applying a pre-cured tread band along an outer side of the bonding layer; and, arranging a bonding layer between the intermediate tread layer and the pre-cured tread layer after the step of bonding the intermediate tread layer. It is understood that the step of bonding may be accomplished by any known curing or vulcanization process, such as a hot molding process.

Such methods may further include the step of shaping the intermediate tread layer prior to the step of applying a pre-cured tread band. Before a pre-cured tread band is applied, the intermediate tread layer may be shaped to receive a particular new tread layer, and potentially a bonding layer prior to application of the new tread layer. The step of shaping may be performed by any method, mechanism, or means discussed or contemplated above in conjunction with shaping the bonding layer.

Such methods may further include a step of applying a pre-cured tread layer along an outer side of the bonding layer such that the bonding layer is arranged between the pre-cured tread layer and the pre-existing tread layer, the pre-cured tread layer having a thickness extending between a front face forming a ground-engaging side of the tread band and a back face arranged atop the bonding layer. The pre-cured tread layer generally forms the final, outer layer the retreaded tire tread. The outer side of the pre-cured tread layer generally forms the outer, ground-engaging side of the retreaded tire. Accordingly, the outer side of the pre-cured tread layer may include any desired arrangement of tread voids, such as longitudinal grooves, lateral grooves, and lateral sipes, for example. Such voids generally form recesses along the outer side of the pre-cured tread layer. In particular embodiments, the pre-cured tread may have no tread voids or only a portion of the desired voids, and as a result additional voids may be formed after the retreaded tire tread has been cured. Any known bonding adhesive may be arranged between the pre-cured tread layer and the bonding layer to facilitate proper bonding there between, such as when the bonding layer is pre-cured. The bonding adhesive is curable or capable of being vulcanized. Accordingly, further steps of such methods may include the step of bonding the pre-cured tread layer to the tire carcass to form a retreaded tire having a retreaded tire tread. In particular embodiments, such step may comprise bonding the pre-cured tread band to the bonding layer and bonding the bonding layer to the pre-existing tread layer to form a retreaded tire tread, the retreaded tire tread including the pre-cured tread band, the bonding layer, and the pre-existing tread layer. The step of bonding may be achieved by any known means of curing the pre-cured tread layer to the bonding layer and curing the bonding layer to the pre-existing tread layer and/or the tire carcass. For example, the assembled retreaded tire carcass may be enclosed at least partially within a curing membrane, which is sealed and together placed within an autoclave or other curing vessel. The space arranged between the assembled tread layers and the curing membrane is placed under vacuum pressure and a curing chamber within the curing vessel is heated and pressurized to cure the assembled tread into a retreaded tire tread and to the tire carcass to form a retreaded tire. Other methods for performing the bonding step are known to one of ordinary skill in the art, each of which may be employed to achieve this step.

Such methods may further include a step of forming grooves in the retreaded tire tread along a ground-engaging, outer side of the retreaded tire tread. In particular embodiments, such steps may comprise forming grooves in the retreaded tire tread, the grooves extending a target depth into the pre-existing tread layer, wherein pre-existing tread layer material is removed until reaching the target depth within the pre-existing tread layer of the retreaded tire tread. This target depth may coincide with the original groove bottom depth of the pre-existing tread. Once the multiple layer, assembled tread is cured to form a retreaded tire tread, grooves may be formed in the cured retreaded tire tread. Such grooves may comprise any longitudinal or lateral groove formed along a ground-engaging, outer side of the retreaded tire tread. Forming such grooves may comprise expanding or reshaping a groove pre-existing within the retreaded tire tread. Expanding the groove may include widening the groove and/or further extending (i.e., deepening) the groove into a thickness of the retreaded tire tread to a desired thickness. The groove may also be lengthened and/or reshaped as part of the step of forming. In particular cases, only the groove position may have been formed in the mold to guide later formation of the groove. In particular embodiments, the step of forming includes extending one or more grooves of the pre-cured tread band further into a thickness of the retreaded tire tread to a final depth arranged within the pre-existing tread layer. The formed groove, or the formed portion of the groove, may or may not coincide with any pre-existing groove of the pre-existing bonding layer previously filled with bonding layer material. Such methods may be performed by any known means, such as abrading (i.e., buffing or grinding) or cutting operations. In particular embodiments, the step of forming grooves includes using a heated cutting blade having a desired cross-sectional shape, the heated blade being inserted into a thickness of the retreaded tire tread to remove a portion of the retreaded tire tread.

Particular embodiments of the methods discussed above will now be described in further detail below in association with the figures filed herewith exemplifying the performance of particular embodiments of such methods.

Figure 1:
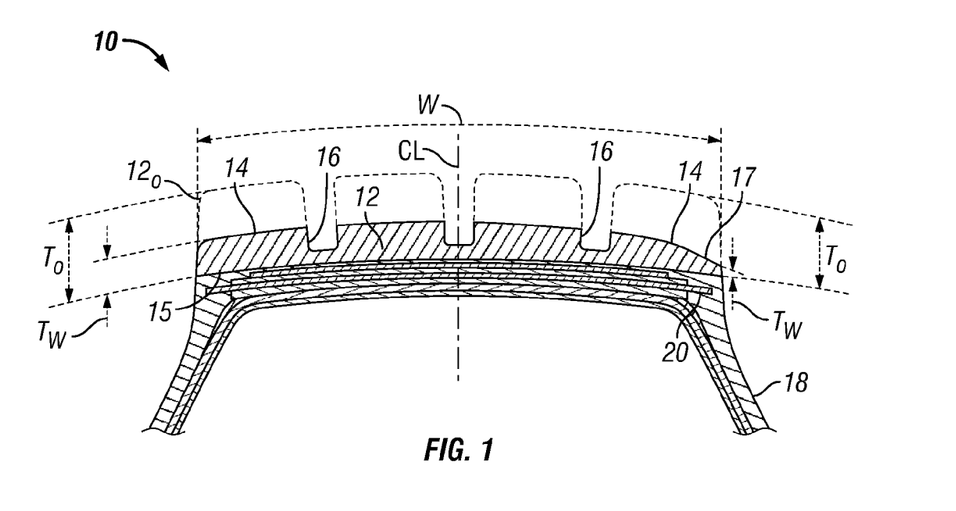
FIG. 1 is a partial cross-sectional view of an exemplary worn tire before it is retreaded, showing the worn pre-existing tread layer in association with the original, unworn cross-sectional profile, the tire including a plurality of voids comprising longitudinal grooves spaced laterally apart between a plurality of ribs along a tread of the tire, according to a particular embodiment of the invention, and including areas of uneven wear.

With reference to FIG. 1, a partial cross-sectional view of an exemplary worn tire 10 is shown. The dashed lines $12_O$ denote the original tread profile having an original thickness $T_O$, which has been worn to provide a pre-existing tread layer 12 atop a tire carcass 18 having a variable thickness $T_W$ extending between an outer and inner sides 14, 15 of the pre-existing tread layer. The term "pre-existing tread" as used herein is synonymous with the term "pre-existing tread layer." As mentioned above, the pre-existing tread layer 12 may be symmetric or asymmetric relative to the tire centerline CL. In the embodiment shown, uneven wear has provided an asymmetric pre-existing tread layer 12. The pre-existing tread layer 12 shown includes voids 16 arranged along an outer side of the pre-existing layer. Voids 16 extend into a thickness of the pre-existing layer from the outer side. In the embodiment shown, the voids comprise longitudinal grooves extending longitudinally in a lengthwise direction of the tread 12, and in a circumferential direction about the tire 10. In other variations, voids 16 may comprise any other void, including any longitudinal sipes, or any lateral grooves or sipes each extending longitudinally in a lateral direction across the tread width W. Pre-existing tread layer 12 may also have been exposed to uneven wearing, such that the thickness $T_W$ does not remain constant between outer and inner sides 14, 15. Such uneven wear may form a low spot 17 along the outer side 14. A low spot 17 may also result from damage.

Tire carcass 18 includes a reinforcement package 20. Pre-existing tread layer 12 is arranged above a reinforcement package 20. While the longitudinal grooves 16 may extend the full depth of tread layer 12, FIG. 1 provides grooves 16 that are commonly offset or raised a distance above the bottom of the tread. This distance is commonly referred to as tread under groove depth or thickness.

Upon receipt of a tire in need of retreading, the pre-existing tire tread may be prepared for retreading. Once the pre-existing tread 12 has been prepared for retreading, the pre-existing tread is referred to as a prepared tread layer 12', which is shown in a particular embodiment in FIG. 2. Retreading preparations may include generally cleaning the tire tread, such as with a solvent for example. Preparation may also include removing at least a portion of the pre-existing tread layer 12, such as by performing any known material removal operation or process. For example, a material removal operation may comprise an abrading or cutting operation. A common abrading operation is buffing, which comprises applying a rotating abrasive disk or drum to an outer side 14 of the pre-existing tread.

Figure 2:
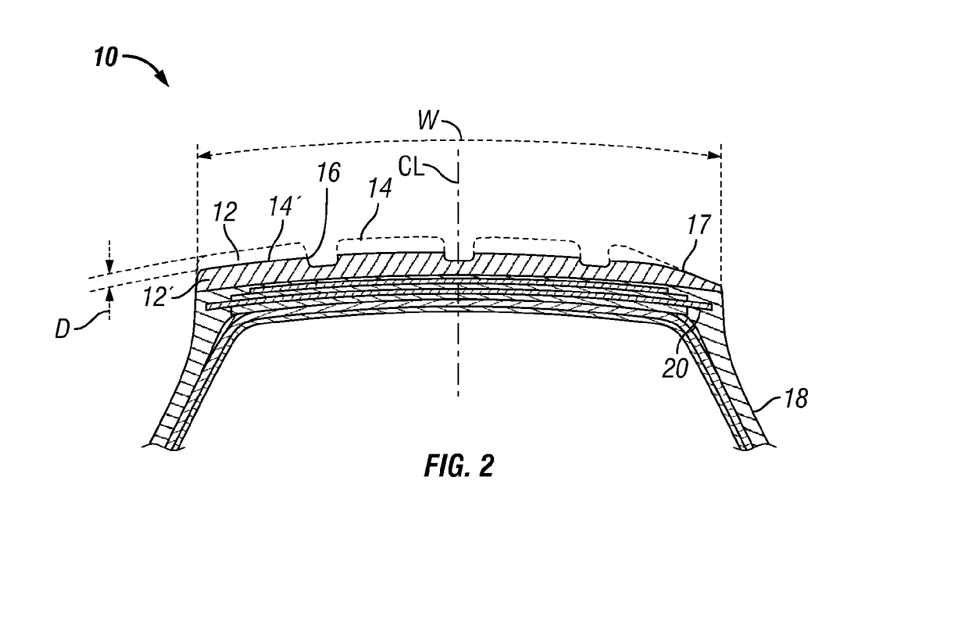
FIG. 2 is a partial cross-sectional view showing the tire of FIG. 1 after a material removal process has been performed on the tire to remove a desired amount of tread thickness in preparation for application of a new tread layer in accordance with a particular embodiment of the invention, the figure also showing the worn tread profile of FIG. 1 prior to performance of the material removal process.

With reference to FIG. 2, a predetermined thickness of the tread 12 may be removed until reaching a desired target depth D for the purpose of receiving a particularly shaped new tread and forming a desired retreaded tire tread. Accordingly, any thickness of tread material may be removed along the width W of pre-existing tread 12 to form a prepared tread layer 12'. For example, a constant thickness or variable thickness of tread may be removed from pre-existing tread 12, each of which may result in a prepared tread layer 12' having an outer side extending a constant or variable target depth above the tire carcass. With reference to FIG. 2, a constant target depth is provided, however, portions of the tread extend beyond the target depth, namely, grooves 16 and excessively worn portion 17. This results in a variable thickness prepared tread layer 12'. In a particular embodiment, a thickness of the pre-existing tread 12 is removed such that the depth of each groove 16 is approximately 3 millimeters in depth. While not shown in FIG. 2, it is noted that the groove may also be widened and/or deepened to accommodate any new material that may be arranged atop the prepared tread layer during retreading operations, such as bonding layer material and/or new tread material. It is also noted that in certain embodiments little to no tread material may be removed from the pre-existing tread layer 12 prior to receiving a bonding layer or other material.

Figure 3:
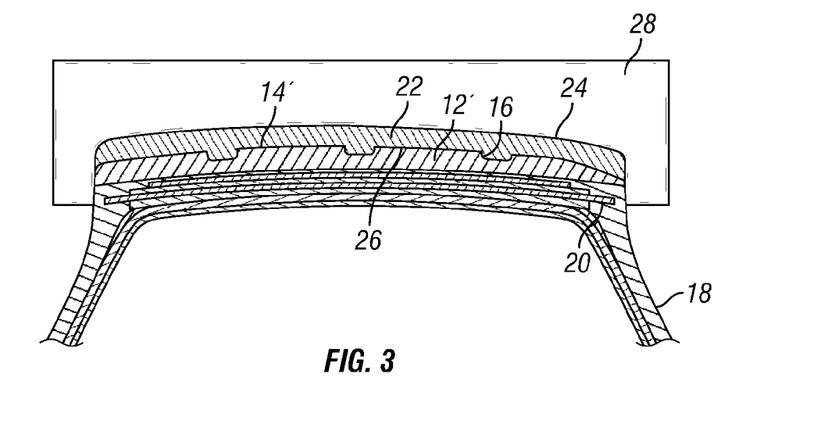
FIG. 3 is a partial cross-sectional view of a bonding layer being extruded upon the tire of FIG. 2, where the bonding layer substantially fills the voids comprising longitudinal grooves as well as the uneven wear in the pre-existing tread layer of the tire, in accordance with a particular embodiment of the invention.

Once the pre-existing tread layer has been prepared by removing any desired thickness of tread material, if any, a layer of bonding material is applied along an outer surface of the pre-existing tread layer or of the prepared tread layer to form a bonding layer. The bonding layer facilitates bonding between pre-existing tread material (either in the pre-existing tread layer or in the prepared tread layer) and the new tread material being applied to form the retreaded tire tread. With reference to FIG. 3, a bonding layer 22 is shown being extruded atop the prepared tread layer of FIG. 2. By extruding the bonding layer onto the prepared tread layer 12', any voids 16 or low points 17 arranged along outer side 14' may be substantially filled with bonding layer material while still providing a bonding layer outer side 24 comprising any desired configuration, which may include any grooves, voids, or other recesses for interaction or mating with a bottom side of a new tread layer. In the embodiment shown in FIG. 3, outer side 14' is smoothly contoured and free of any recesses or other abnormalities. A bottom side 26 of bonding layer is arranged along the outer side 14 of the pre-existing tread layer 12. Extruding operations may be performed by any known extruder 28, which may extrude the full tread width or any partial widths of the tread, such as when extruding between longitudinal grooves 16 along tread ribs or elements.

Figure 4:
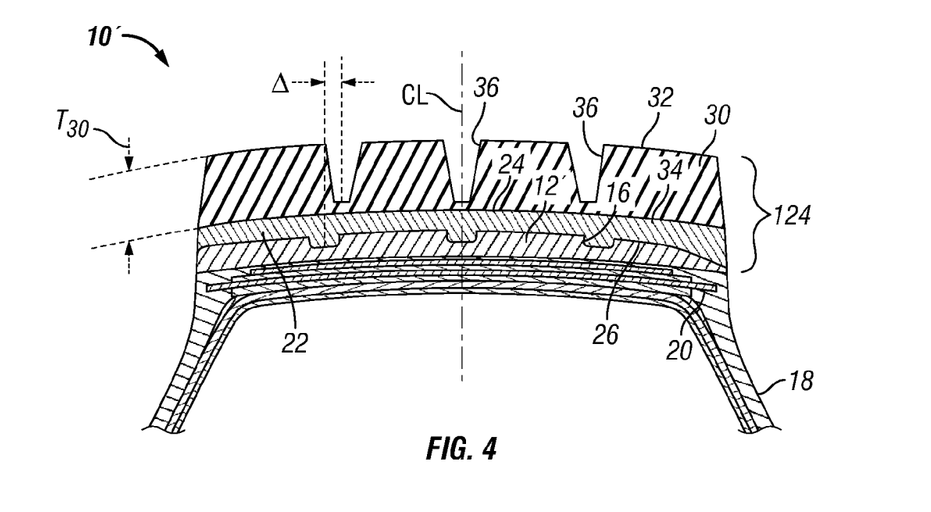
FIG. 4 is a partial cross-sectional view of a new tread layer applied to the tire of FIG. 3 in accordance with an embodiment of the invention, the new tread layer including voids comprising longitudinal grooves where a central or middle groove is aligned with a groove in the pre-existing tread layer while the other two grooves are not aligned laterally with the pattern below.

With reference to FIG. 4, subsequent to formation of a bonding layer 22, a new tread layer 30 is arranged on the bonding layer outer side 24 atop bonding layer 22 to form an assembled retreaded tire 10'. New tread layer 30 may be formed by any means known to one of ordinary skill in the art. For example, new tread layer 30 may comprise a pre-cured tread layer formed by a molding operation. By further example, new tread layer 30 may be formed by stacking multiple sub-layers atop one another, the sub-layers comprising uncured tread material or cured tread material having bonding layer material arranged between each sub-layer.

New tread layer 30 has a thickness $T_{30}$ extending between an outer side 32, which forms a ground-engaging side, and an inner side 34 for bonding to the pre-existing tread layer and/or the tire carcass via the bonding layer. The new tread layer 30 may be configured as desired. For example, outer and/or inner sides 32, 34 may include one or more voids 36 extending into the new tread thickness. Such voids 36 may include longitudinal or lateral grooves or sipes, for example. To achieve the same skid or groove depth as the original new tire, the new tread can be thinner by the amount of thickness retained in the pre-existing tread, reducing the amount of new tread material needed.

It is understood that voids 36 may be shaped and arranged within new tread layer 30 as desired. For example, any void 36 may be aligned with, or misaligned with, any voids 16 arranged within the pre-existing tread layer 12 and filled with bonding layer material. For example, with reference to FIG. 4, outer longitudinal grooves 36 arranged in the new tread layer 30 are formed laterally misaligned with corresponding filled grooves 16 arranged within the pre-existing tread layer 12, while the central or middle groove 36 is aligned with a corresponding groove 16 in the pre-existing tread layer. In any event, any voids formed may or may not be aligned with any void arranged within the pre-existing tread layer.

Once the assembled retreaded tire 10' is formed, the new tread layer 30 is bonded to the tire carcass 18 by any known curing or bonding process. For example, a curing membrane is placed around the outer side of the assembled retreaded tire, and at the very least, about the assembled tread, the assembled tread comprising the new tread layer 30, the bonding layer 22, and the pre-existing tread 12. A hot molding operation employing a mold extending about the outer side of new tread layer 30 may also be employed, such as when the new tread layer 30 is uncured.

Figure 5:
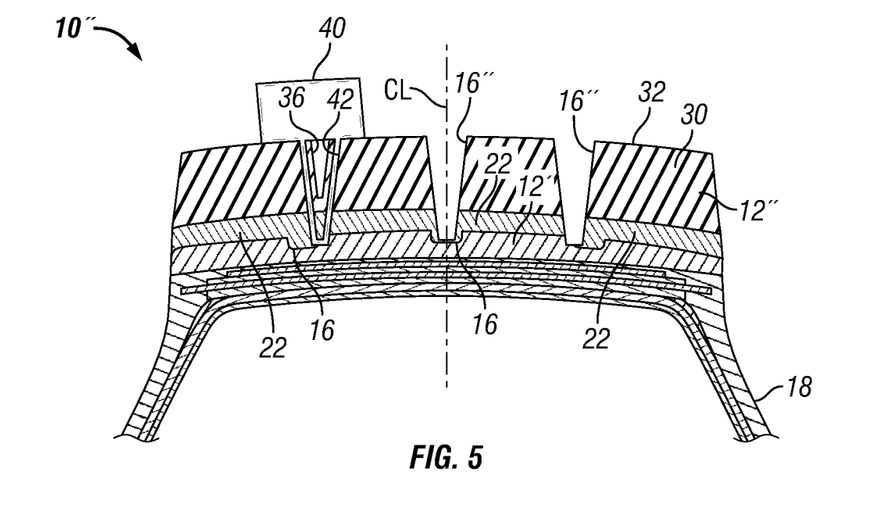
FIG. 5 is a partial cross-sectional view of the tire of FIG. 4 after performance of a bonding process to form a retreaded tire, the figure showing a formation of grooves in the retreaded tire tread using a heated blade according to a particular embodiment of the invention, the resulting grooves expose the bonding layer and the pre-existing tread layer along one or more surfaces forming each such groove.

With reference to FIG. 5, after the assembled retreaded tire 10' is bonded or cured, a retreaded tire 10" is formed having a tread layer 12". Because any pre-existing grooves 16 or other voids arranged in the pre-existing tread layer 12 have been filled by bonding layer 22, any grooves or voids 36 arranged in the retreaded tire tread layer 12" do not extend to a depth of the original grooves 16, that is, to the depth of the grooves 16 in the pre-existing tread layer 12. Therefore, in order for any groove or other void 16" to extend to a similar depth within the pre-existing tread layer 12, tread material must be removed from the retreaded tire tread 12" to form the void 16" or to extend a void 36 arranged within new tread layer 30 deeper into the retreaded tire tread 12" to form the final void 16". In doing so, the bonding layer 22 is exposed to the void 16" such that the bonding layer forms a portion of the surface forming the groove. This is shown by example in FIG. 5. While the void 16" may extend within a thickness of the pre-existing tread 12, the pre-existing tread may not be exposed to void 16", such as when void 16" terminates within a void 16 formed within a thickness of the pre-existing tread. This is shown by example with reference to the middle void 16" in FIG. 5. Of course, if not terminating entirely within a void 16, void 16" may expose the pre-existing tread layer 12 such as is shown by example with reference to the remaining voids 16" shown in FIG. 5.

Accordingly, any void 16", such as longitudinal or lateral grooves or sipes, may be formed into the retreaded tire tread 12" as desired. For example, in instances where new tread layer 30 includes one or more voids 36 comprising longitudinal and/or lateral grooves, voids 16" may be formed by extending voids 36 deeper into the retreaded tire tread 12" and through any bonding layer present and finally into the pre-existing tread layer 12 from new tread layer 30. Further, adding or forming a final void 16" into the retreaded tire tread may comprise widening, lengthening, or otherwise reshaping any void 36. By further example, when desiring to add a void that otherwise is not present in new tread layer 30, such as when, for example, new tread layer 30 is free of any voids 36, one or more voids may be formed after bonding or curing operations within new tread layer 30 and into retreaded tire tread 12" to any depth desired. In the figure shown, each void 16" formed into the retreaded tire tread exposes the bonding layer, whereby the bonding layer forms a portion of the surface of each grooved formed in the retreaded tire tread.

By employing this process of forming voids such as grooves in the retreaded tire tread after application of the new tread layer, any pattern or arrangement of grooves or other voids may be formed into the retreaded tire 10" and its tread 16". This arrangement of voids along tread 16" may be the same or different than the arrangement of voids within the original tire tread or the pre-existing layer 12. Accordingly, in relation to any original or pre-existing void 16, new voids 16" may be arranged differently in a lateral direction, which is shown by example in FIG. 5 to be misaligned, may have different widths, may extend to different depths, and/or may extend longitudinally in different paths along tread 12".

Formation of grooves 16" may be performed by any means. With reference to FIG. 5, such means comprises a regrooving tool 40 comprising a heated blade or knife 42. The blade is cross-sectionally shaped to have a profile generally representing the final cross-sectional shape of groove 16", although in other embodiments, any other profile may be employed, such as when making multiple passes with tool 40 or when removing particular portions of tread 12" to form groove 16". The blade may be heated by any known means, such as by electrical resistance or conductance from any heat source. Grooves 16" may also be formed by a rotary tool, which may include blades, edges, or an abrasive sufficient for removing material from tread 12".

When low spots are present along the pre-existing tread layer, which may arise due to excessive wear or damage, an intermediate tread layer may be used to fill the low spot and otherwise provide a thickness of new tread before applying the new tread layer. This intermediate tread layer may be formed of any tread material, such as any elastomeric or polymeric material which includes natural and synthetic rubbers. The intermediate tread layer may be formed and arranged between the pre-existing tread layer and the new tread layer according to any known means for forming and/or applying the intermediate tread layer, including any means used to form and/or apply the bonding layer as discussed above. For example, the intermediate layer may be formed by rolling or extrusion, and may be applied directly onto the tire during formation of the intermediate tread layer, or after formation of said layer. As such, the intermediate tread layer may extend a full width of the tread or be applied in particular locations along the tread, such as along ribs or tread elements arranged along the tread. Accordingly, the intermediate tread layer may be annular or non-annular, as the intermediate tread layer may be applied as needed based upon the wear of the tire. Further, the intermediate layer may be formed of annular members or assembled by using non-annular sections or segments.

Figure 6:
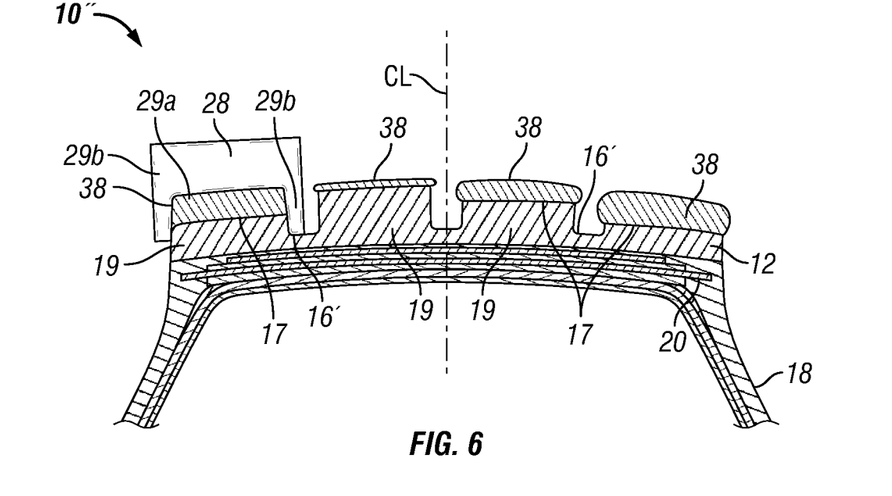
FIG. 6 is a front sectional view of a tire, whereby an intermediate tread layer is being extruded onto the pre-existing tread layer along its outer side according to a particular embodiment of the invention.

By example, with reference to FIG. 6, an intermediate tread layer 38 is shown. In this embodiment, the intermediate tread layer comprises uncured tread material extruded onto the pre-existing tread layer 12 along its outer side 14. In particular, the intermediate tread layer is extruded along the outer side of each rib 19, the rib comprising one or more tread elements arranged annularly between a pair of voids 16 comprising longitudinal grooves. The extrusion process may be performed along each rib individually as exemplarily shown in FIG. 6, or concurrently along each rib by an extruder extending across the full width of the tread—similar to the extrusion process being performed in FIG. 3, although guides may or may not be arranged within each longitudinal groove to generally restrict or partially restrict the arrangement of intermediate tread layer material into each such groove. Before the intermediate layer is formed, pre-existing tread layer 12 may be unprepared or prepared to comprise a prepared pre-existing tread layer 12' as discussed above.

Figure 9:
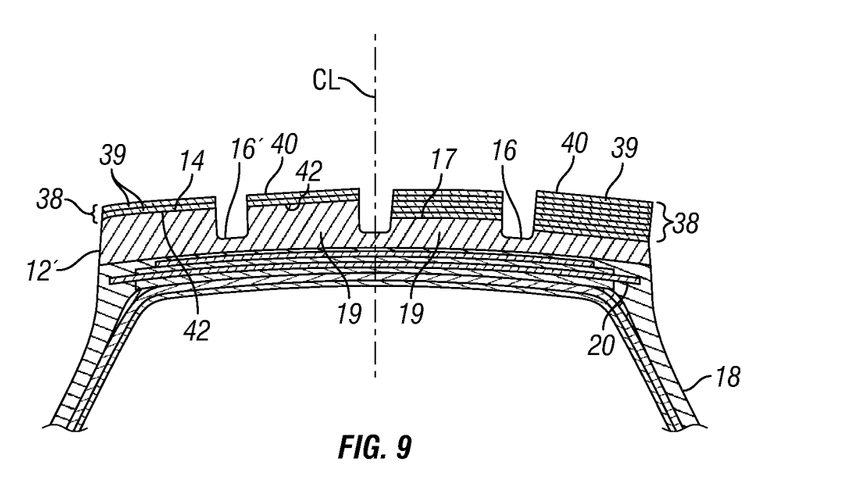
FIG. 9 is a front sectional view of a tire whereby an intermediate tread layer is formed by arranging one or more strips of tread material atop the pre-existing tread layer according to a particular embodiment of the invention.

By further example, with reference to FIG. 9, an intermediate tread layer 38 is formed by arranging one or more strips 39 of tread material atop the pre-existing tread layer 12. Strips 39 may comprise uncured or cured tread material. In the embodiment shown, strips 39 have a uniform, constant thickness, whereby the pre-existing tread layer is prepared by removing sufficient tread material along each rib 19 such that a quantity of strips may be stacked on each rib to achieve a particular total thickness $T_{38}$. In combination with a corresponding rib of the pre-existing tread layer, each stack of strips forms an intermediate rib 19' having a total thickness $T_{19'}$. The thickness of each intermediate rib 19' is formed to cooperate with a corresponding thickness of the new tread layer 30 to form a retreaded tire tread 12" having a desired total thickness. By applying different quantities of stacked strips 39, a pre-existing tread layer 12 having ribs of different thicknesses arranged asymmetrically about a tread centerline may be used without artificially removing tread material to reduce thicker ribs to a thickness of the thinnest rib or to a thickness forming a pre-existing tread layer of symmetrical thickness. By reducing the amount of material removed from the pre-existing layer to facilitate attachment of a new tread layer, wasted material is reduced.

Figure 7A:
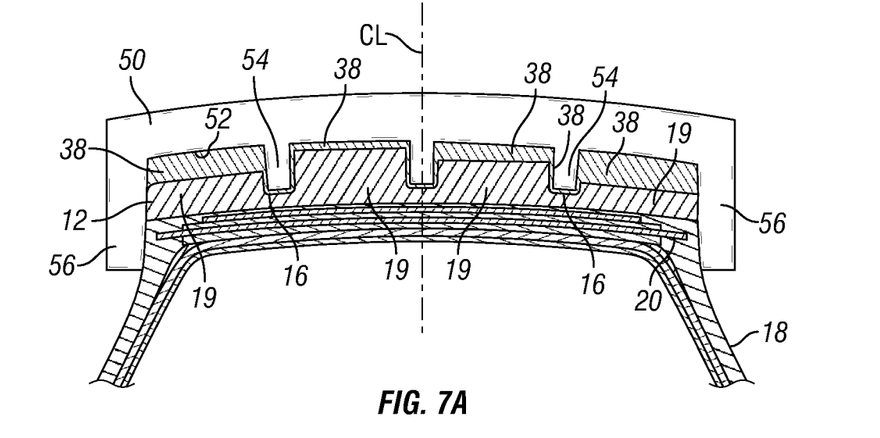
FIG. 7A is a front sectional view of a tire, whereby the intermediate tread layer of FIG. 6 is being molded to shape the intermediate tread layer as desired prior to application of the new tread layer according to a particular embodiment of the invention.

If desired, the intermediate tread layer may be shaped and/or bonded before application of the new tread layer to form a shaped intermediate tread layer. Shaping may be performed manually or automatically by a means for shaping the material forming the intermediate tread layer. For example, with reference to FIG. 7A, a mold 50 is manually or automatically applied to the outer side surface of the intermediate tread layer 38 and into any groove 16, 16' as desired, the mold having a cavity 52 shaped to form the intermediate tread layer into a corresponding, desired shape. The mold 50 may be heated or maintained at room temperature if the intermediate tread layer 38 is sufficiently deformable. For example, the intermediate tread layer may remain heated after an extrusion process, such that a cold mold (i.e., a room temperature mold) may be applied with sufficient pressure to deform the intermediate tread layer into a desired shape. The tire 10 may be pressurized during the molding operation to sufficiently resist application of the mold to the outer tire side. The shaped intermediate layer may or may not extend into any grooves 16, 16' arranged along the pre-existing tread layer 12, 12'. Further, the tire and/or the intermediate tread layer may be heated in addition to, or lieu of, heating the mold. The mold 50 may shape the entire tread concurrently or in sections, whereby the molding process is repeated as necessary to shape portions of the tread. Extensions 54 may be provided to control or restrict the flow of material into, or from, any grooves or other voids arranged within the outer side of the intermediate tread layer. Side extensions 56 may also be provided to control the shaping of the lateral extent of the intermediate tread layer. Side extensions 56 may double as an extension 54, such as when mold only engages a portion of the intermediate tread layer width—similar to the extruder of FIG. 3 used to form the bonding layer. It is understood, however, that shaping may not be desired when a desired shape is achieved during formation and/or application of the intermediate tread layer upon the pre-existing tread layer— regardless of how the intermediate tread layer is formed and/ or applied. Accordingly, the intermediate tread layer 38 may be shaped or molded when said layer is formed by applying strips of material as exemplarily shown in FIG. 9.

Shaping could also be performed using a hot regrooving tool, which generally uses a heated blade shaped into a shape for removing material from the intermediate tread layer. In such instances, the regrooving tool would be used to form grooves in the intermediate tread layer, such as when the intermediate tread layer enters a groove or void within the pre-existing tread layer or otherwise when a groove is to be formed in the intermediate tread layer and/or the pre-existing tread layer to receive a portion of the new tread layer. A hot regrooving tool is shown by example in FIG. 5 performing another purpose, namely, forming enlarged grooves within a retreaded tire.

Figure 7B:
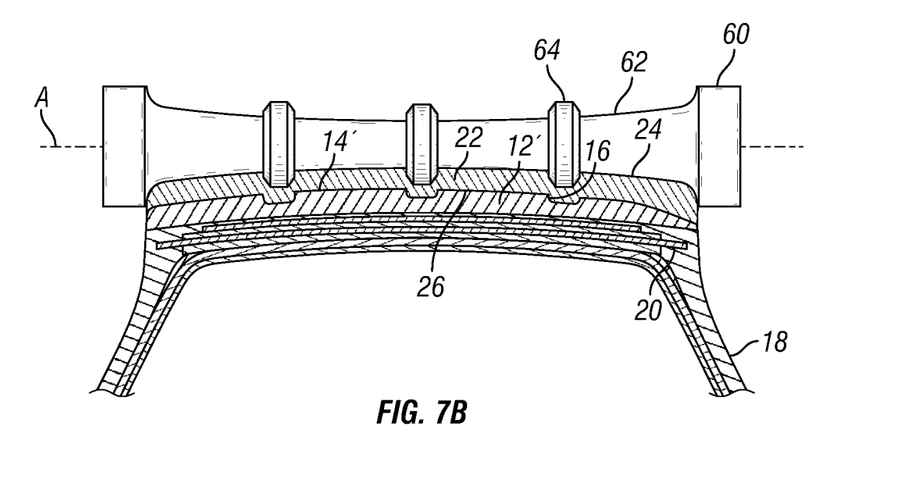
FIG. 7B is a front sectional view of a tire, whereby the intermediate tread layer is being shaped by use of a roller according to a particular embodiment of the invention.

Shaping may also be performed by applying one or more rollers (also referred to as drums) to an outer side of the intermediate tread layer. This may also be employed for shaping the bonding layer when desired. With reference to FIG. 7B, a roller 60 includes a forming region 62 for engaging the outer side of the intermediate tread layer, the region being shaped as desired to form and shape the outer side of the intermediate tread layer to any desired shape or contour. For example, roller 60 may form a generally smooth outer surface, which may be flat or contoured and generally free of any voids, such as grooves. The outer side of such an intermediate bonding layer would resemble, in particular embodiments, the outer side of the bonding layer 22 of FIG. 3. By further example, with reference to FIG. 7B, roller 60 may include protrusions 64 extending outwardly from the forming region 62, whereby a corresponding shape is imparted into the intermediate tread layer, such as to form a groove or other void within the intermediate tread layer. In lieu of employing a single roller spanning the entire width of the tread, one or more narrower rollers maybe employed to shape the intermediate tread layer in one or multiple revolutions of the tire carcass. A force may be applied to the roller to sufficiently deform the intermediate tread layer material. The roller may also be heated to increase the ductility of the intermediate tread layer material for shaping operations.

By applying the intermediate tread layer between the voids, that is, where the voids or longitudinal grooves remain generally free of the intermediate tread layer, the pre-existing voids may remain accessible to the new tread layer to maintain a desired amount of volumetric void. Still, it is understood that an intermediate tread layer may extend into the voids, such as when forming an intermediate tread layer that extends a full width of the tread (e.g., a full width of the pre-existing tread layer or of the bottom side of the new tread layer). In such instances, a reduced depth void may be desired, or the void may have been widened and/or deepened to accommodate the intermediate tread layer to achieve a void in the retreaded tire tread of a pre-determined depth.

Figure 8:
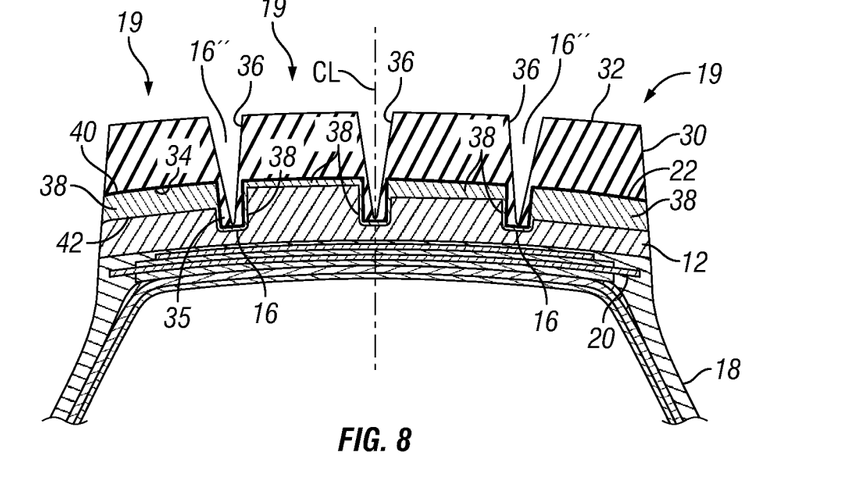
FIG. 8 is a front view of the tire of FIG. 7A, whereby a new tread layer has been placed atop the intermediate tread layer according to a particular embodiment of the invention.

Once the intermediate tread layer is formed and applied to the tire, a new tread layer is applied to tire. With reference to FIG. 8, this new tread layer may comprise any new tread layer discussed or contemplated herein. A bonding layer may be arranged between the new tread layer and the intermediate tread layer, such as when neither the new tread layer nor intermediate tread layer is cured. The bonding layer may comprise any material or solution discussed above. Once the new tread layer is applied, the new tread layer is cured to the tire by any known method or means of curing. For example, the retreaded tire is placed within a curing envelope, which is then placed under vacuum pressure and inserted into a curing vessel, such as an autoclave, where heat and pressure is applied to the curing membrane for a desired duration.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A method for retreading a tire comprising the steps of:
providing a tire carcass for retreading, the tire carcass having a pre-existing tread layer extending widthwise across the tire in a lateral direction, the pre-existing tread layer including a pair of longitudinal voids manufactured to extend into the tread layer thickness from an outer side of the pre-existing tread layer and to extend annularly around the pre-existing tread layer to define a rib arranged annularly along the outer side of the pre-existing tread layer and forming a part of a tread pattern of the pre-existing tread layer;
applying a layer of uncured elastomeric material along an outer side of the pre-existing tread layer, the layer of uncured elastomeric material filling the voids and covering the rib arranged along the outer side of the pre-existing tread layer to provide the outer side with the layer of uncured elastomeric material in preparation for receiving a pre-cured tread layer;
applying the pre-cured tread layer along an outer side of the layer of uncured elastomeric material such that the layer of uncured elastomeric material is arranged between the pre-cured tread layer and the pre-existing tread layer, the pre-cured tread layer having a thickness extending between a front face forming a ground-engaging side of the pre-cured tread layer and a back face arranged atop the layer of uncured elastomeric material;
bonding the pre-cured tread layer to the tire carcass to form a retreaded tire having a retreaded the tread, where the layer of uncured elastomeric material is cured to become a layer of cured elastomeric material; and,
forming a groove in the retreaded the tread along a ground-engaging, outer side of the retreaded tire tread by expanding a pre-existing groove of the pre-cured tread, such that a portion of the cured elastomeric material is removed in the step of forming a groove, exposing the layer of cured elastomeric material and material of the rib in the formed groove.

2. The method of claim 1, where the step of applying a layer of uncured elastomeric material comprises extruding the layer of uncured elastomeric material onto the outer side of the pre-existing tread layer.

3. The method of claim 1, where the step of applying a layer of uncured elastomeric material forms a variable-thickness layer of uncured elastomeric material such that the layer has different thicknesses at different lateral locations along the outer side of the pre-existing tread layer whereby the combined thickness of the layer of uncured elastomeric material and the pre-existing tread layer is constant.

4. The method of claim 2 further comprising the step of:
removing at least a portion of the pre-existing tread layer to a pre-determined depth from the outer side of the pre-existing tread layer prior to the step of applying a layer of uncured elastomeric material.

5. The method of claim 2 further comprising the step of: shaping the layer of uncured elastomeric material prior to the step of applying a pre-cured tread layer.

6. The method of claim 5, where the step of shaping is performed using one or more rollers pressed against the outer side of the layer of uncured elastomeric material.

7. The method of claim 6, where the one or more rollers are heated.

8. The method of claim 1, where the layer of uncured elastomeric material comprises a bonding layer.

9. The method of claim 1, wherein the step of forming the groove includes using a heated cutting blade having a desired cross-sectional shape, the heated blade being inserted into a thickness of the retreaded tire tread to remove a portion of the retreaded tire tread.

* * * * *